Patented Feb. 7, 1950

2,496,894

UNITED STATES PATENT OFFICE 2,496,894

MANUFACTURE OF ANTHRAQUINONE

Glen Miller Smyth, Plainfield, and Albert Edward Moran, Somerville, N. J., assignors to American Cyanamid Company, New York, N. Y., a corporation of Maine No Drawing. Application February 26, 1947, Serial No. 731,042

11 Claims. (Cl. 260—369)

This invention relates to an improvement in the process of manufacturing anthraquinone from phthalic anhydride and benzene by a Friedel-Crafts reaction. More particularly, the present invention relates to a process in which the intermediate reactions are all carried out in the same reactor, and preferably to a process producing a dry, free-flowing powder.

The usual syntheses of anthraquinone are effected in processes involving at least three steps. In the first step, an aluminum chloride complex of o-benzoyl benzoic acid is prepared by reaction between benzene and phthalic anhydride using a Friedel-Crafts condensing agent, anhydrous aluminum chloride. In one variant, the complex, after being freed from excess benzene, is hydrolyzed with dilute mineral acid, such as dilute sulfuric acid, o-benzoyl benzoic acid being set free, isolated and dried. In another variant, the hydrolysis precedes or accompanies removal of excess benzene. In both variants, hydrolysis produces wet hydrogen chloride. In the last step, the o-benzoyl benzoic acid is subjected to ring closure to anthraquinone by heating in the presence of a considerable excess of concentrated sulfuric acid or oleum.

The usual processes gave rise to a number of practical manufacturing difficulties. The hydrolysis reaction produced wet hydrogen chloride which is highly corrosive. Similarly, the reaction liquid in the hydrolysis step with dilute acid is also strongly corrosive and attacks most ordinary metal equipment. A further disadvantage is the fact that it is ordinarily not practical to recover the hydrochloric acid which is set free in the hydrolysis step as a result of interaction of aluminum chloride and sulfuric acid, and a considerable economic loss thus results.

The manufacturing difficulties involved in the old processes have led to a number of improvements which have eliminated, at least partially, some of the disadvantages. One of the practical improvements which is generally employed in large scale manufacture is to carry out the first step, the production of the o-benzoyl benzoic acid aluminum chloride complex, in a ball mill or similar reactor provided with means for grinding the product. Operating in such a manner permits the use of a minimum of excess benzene and assures a complete reaction between phthalic anhydride, benzene, and aluminum chloride. The product of this first step may be obtained in the form of a free-flowing powder by distilling off excess benzene in the same reactor. The product is then customarily subjected to the other steps recited above, namely, hydrolysis with dilute mineral acid and ring closure with strong sulfuric acid. While the use of a ball mill or a similar reactor has resulted in material economies in the first step, it does nothing toward solving the corrosion and wet hydrogen chloride recovery problems.

A proposal has been made to eliminate the separate hydrolysis by treating the dry aluminum chloride o-benzoyl benzoic acid complex with a large excess of concentrated sulfuric acid, for example, about 3 parts of acid to 1 part of the complex, or slightly less when oleum is used in place of concentrated sulfuric acid. This process has never achieved any manufacturing success and is not used commercially. The reasons are not far to seek. The sulfuric acid in the amounts used transforms the dry complex into a lumpy or pasty material which presents such serious handling problems that the process has not been satisfactory, in spite of its theoretical attractiveness.

According to the present invention, hydrolysis and ring closure of the aluminum chloride o-benzoyl benzoic acid complex are effected directly with oleum in an amount such that the reaction mass never becomes pasty and permits the production of a dry and preferably free-flowing powder. All of the reactions, including the production of the complex, may advantageously be carried out in the same reactor, such as a ball mill. However, the last two process steps may be effected in a separate reactor. In both cases, the advantages of corrosion elimination, ready and complete recovery of hydrogen chloride, which is given off as a non-corrosive, dry gas, are obtained. At the same time, the elimination of handling of intermediate products, in the case of the preferred embodiment, or further simplification, in case two reactors are used, is an advantage of the present invention. In every case, the difficulties arising from a gummy reaction product in the ring closure step are also avoided.

The present process is made possible by the discovery that there is a very sharp and definite upper limit in the amount of oleum used in effecting hydrolysis and ring closure. We have found that the amount of oleum should not exceed about 1.3 parts per part of aluminum chloride o-benzoyl benzoic acid complex. If this figure is materially exceeded, a paste begins to form and the process becomes unattractive because the material is difficult to handle. The lower amount of oleum is set by that which permits complete ring closure. This lower limit is affected to some degree by several factors, notably completeness of grinding, fineness and uniformity of distribution of the oleum, temperature of introduction, time of reaction, and oleum strength. Excellent results are obtained under all conditions when the amount of oleum is between .9 part and 1.3 parts. We prefer to operate in the range of .9 part to 1 part.

As has been stated above, the strength of oleum is a factor in determining the exact lower limit which is extremely sharp in each case. Further, there is a limit of oleum strength below which the process loses efficacy even when the amount of oleum is within the proper range. Thus we have found that if the oleum strength drops below 5% oleum, the yield begins to fall off sharply. From 10% to 20% oleum gives the best results and this range is therefore preferred, although the process can be effectively carried out with oleum strength between 5 and 10%. Higher strengths of oleum can be used, but as they do not provide any improvement, and since they present a considerable handling problem, they are not preferred.

The temperature of ring closure, while not critical, should not drop below 105° C. At this point the yield begins to be adversely affected and lower temperatures produce a sharp drop. A temperature range of from about 110° to 150° C. is optimum. Higher temperatures may be used, but as they do not present any advantages and are harder on the equipment, they are not preferred.

In addition, the temperature at which the oleum is added is also of importance, although its effect is not as marked as is the temperature of ring closure. In general, the oleum should be added at a temperature materially above room temperature, preferably from about 60° to 100° C.

It is an advantage of the invention that the particular method of addition of oleum is not unduly critical. Preferably, however, it should be introduced gradually, and in a finely divided state.

The process will be illustrated in greater detail by the following specific examples, all parts being by weight.

EXAMPLE 1

320 parts of anhydrous aluminum chloride and 180 parts of phthalic anhydride are introduced into a large ball mill or similar reactor capable of powerful mixing and grinding. The reactants are ground together until they form a fine, well-blended powder. Thereupon 310 parts of benzene are introduced, grinding is continued, and the temperature of the reaction mixture is gradually increased until the reaction is substantially complete and excess benzene distilled off. About 550 parts of dry powder are thereby produced.

The reactor is next heated to approximately 90° C. and 505 parts of 20% oleum gradually introduced in the form of a fine spray. The temperature is then raised to about 110° C. and maintained until evolution of hydrogen chloride has substantially ceased. The hydrogen chloride which comes off dry may be recovered by simple means as hydrochloric acid.

At the end of the heating period the product in the form of a free-flowing powder is discharged from the mill into 3000 parts of water. The resulting slurry is filtered and the filter cake of anthraquinone washed with warm water. An anthraquinone of good technical purity is obtained which may, if desired, be further purified by conventional methods.

EXAMPLE 2

The process of Example 1 is carried out under rigidly controlled laboratory conditions in order to determine the effect of varying amounts of oleum of different strengths. Laboratory equipment is used for these comparison tests because conditions can be accurately controlled and varied at will. The results obtainable are the same as those produced on a large scale. The following table shows the effects of different amounts of oleum of different strengths.

*Table showing effect of variation of mole ratios on conversion to anthraquinone*

| Ratio of Oleum to o-benzoylbenzoic Acid Mill Product | Oleum Strength | Yield of Crude Anthraquinone | Yield of Unconverted o-benzoylbenzoic Acid |
|---|---|---|---|
| | Per cent | Grams | |
| 1.3/1.0 | 15 | 190 | Negative. |
| 1.15/1.0 | 15 | 192 | Do. |
| 1.0/1.0 | 15 | 198 | Do. |
| .97/1.0 | 10 | 201 | Do. |
| .95/1.0 | 10 | 202 | Do. |
| .93/1.0 | 20 | 213 | Do. |
| .92/1.0 | 20 | 208 | Do. |
| .91/1.0 | 20 | 211 | Do. |
| .908/1.0 | 20 | 194 | Do. |
| .90/1.0 | 20 | 196 | 13.0 g. |
| .854/1.0 | 15 | 155 | 46.0 g. |

It will be noted that yields begin to drop when the lower limit of .9 part of oleum is reached. Yields drop, but more slowly, when the upper limit of equal parts of oleum is passed, and beyond 1.3 parts the product is so pasty that the operation becomes unsatisfactory for mechanical as well as chemical reasons.

EXAMPLE 3

A series of comparison tests were made in a laboratory ball mill used for Example 2, the temperatures being the same as in Example 1, but the strength of oleum being varied to determine its effect. The results are shown in the following table:

*Table showing effect of oleum strength on conversion to anthraquinone*

| Oleum Strength | Ratio of Oleum to Mill Product | Ring Closure Temp. | Yield of Unconverted o-benzoylbenzoic acid | Yield of Anthraquinone |
|---|---|---|---|---|
| Per cent | | ° C. | Grams | Grams |
| 5 | .95/1.0 | 120 | 2.1 | 181 |
| 10 | .95/1.0 | 120 | Neg. | 202 |
| 15 | .93/1.0 | 120 | Neg. | 215 |
| 15 | 1.0/1.0 | 120 | Neg. | 198 |
| 20 | .93/1.0 | 110 | Neg. | 213 |
| 20 | .92/1.0 | 110 | Neg. | 200 |
| 20 | .92/1.0 | 110 | Neg. | 197 |
| 20 | .908/1.0 | 110 | Neg. | 194 |

It will be apparent that the yield begins to drop as the lower limit of 5% oleum is approached, but is maintained at a high point with oleum strengths of 10% or greater, optimum results being obtained with 20% oleum.

EXAMPLE 4

A series of comparison tests were made with the equipment of Examples 2 and 3, using various temperatures of ring closure. The results obtained appear in the following table:

*Table showing effect of temperature on conversion to anthraquinone*

| Ring Closure Temp. | Ratio of Oleum to Mill Product | Strength of Oleum | Yield of Unconverted o-benzoyl-benzoic acid | Yield of Crude Anthraquinone |
|---|---|---|---|---|
| °C. | | Per cent | Grams | Grams |
| 105 | .92/1.0 | 20 | 6.5 | 189 |
| 110 | .92/1.0 | 20 | Neg. | 200 |
| 110 | .92/1.0 | 20 | Neg. | 208 |
| 150 | .91/1.0 | 20 | Neg. | 211 |

It will be noted that yields begin to drop sharply when the minimum temperature of 105° C. is approached, excellent yields being obtained throughout the whole range of 110° to 150° C. Higher temperatures may be used, but the reaction becomes more difficult to control and hydrogen chloride recovery becomes more of a problem.

EXAMPLE 5

A series of tests with the equipment of Examples 2, 3 and 4 were made to determine the effect of the temperature in the mill during addition of the oleum. The results are shown in the following table:

*Table showing effect of temperature of mill during oleum addition on conversion to anthraquinone and recovery of hydrogen chloride*

| Mill Temp. During Oleum Addition | Ratio of Oleum to Mill Product | Strength of Oleum | Ring Closure Temp. | Yield of Crude Anthraquinone | Yield of Unconverted o-benzoyl-benzoic acid | Yield of Recovered Hydrogen Chloride |
|---|---|---|---|---|---|---|
| °C. | | Per cent | °C. | Grams | Grams | Grams |
| 20 | 1.3/1.0 | 15 | 110 | 150 | Neg. | 160 |
| 60 | 1.0/1.0 | 10 | 120 | 189 | Neg. | 156 |
| 60 | .95/1.0 | 10 | 120 | 202 | Neg. | 178 |
| 90 | .92/1.0 | 20 | 110 | 200 | Neg. | 182 |
| 90 | .92/1.0 | 20 | 110 | 208 | Neg. | 160 |
| 90 | .92/1.0 | 20 | 110 | 197 | Neg. | 167 |
| 90 | .91/1.0 | 20 | 150 | 211 | Neg. | 158 |
| 90 | .908/1.0 | 20 | 110 | 194 | Neg. | 171 |
| 100 | 1.0/1.0 | 15 | 120 | 187 | Neg. | 162 |
| 100 | .93/1.0 | 15 | 120 | 215 | Neg. | 163 |
| 100 | 1.0/1.0 | 10 | 120 | 201 | Neg. | 163 |
| 100 | .97/1.0 | 10 | 120 | 201 | Neg. | 160 |
| 100 | .97'/1.0 | 10 | 120 | 231 | Neg. | 163 |
| 100 | .94/1.0 | 10 | 120 | 192 | Neg. | 160 |
| 100 | .93/1.0 | 20 | 110 | 213 | Neg. | 163 |
| 110 | .91/1.0 | 20 | 110 | 182 | 14 | 137 |

It will be apparent that at room temperatures there has been a serious drop in yield and that good results are obtainable, particularly with higher strength oleums from 60° to 100° C. At 110° the results again begin to fall off.

Throughout the tables in the preceding examples negative or negligible yields of unconverted o-benzoyl benzoic acid are frequently abbreviated Neg.

The foregoing examples illustrate the preferred forms of the present invention in which both steps of the process are carried out in a single reactor. For practical commercial production this presents many advantages. However, it should be noted that the important operating savings result from the fact that there is no hydrolysis of the aluminum chloride o-benzoyl benzoic acid complex with weak acid, and therefore the major advantages of the present invention can be achieved even though the condensation, and hydrolysis and ring closure, are carried out in separate pieces of apparatus. Thus it is possible to produce a dry aluminum chloride complex in one piece of equipment and transfer this dry product to another piece of equipment for hydrolysis and ring closure. Sometimes it may even be desired to store the complex under anhydrous conditions. While this additional flexibility of the process of the present invention is an advantage, it is a rare case when practical manufacture would deliberately choose a modification in which the steps of the process are carried out in different equipment. However, in its broader aspects the present invention includes such a procedure.

We claim:

1. As an improvement in the manufacture of anthraquinone from phthalic anhydride and benzene by the Friedel-Crafts method wherein all reactions are effected under anhydrous conditions and the solid reaction products are obtained as free-flowing, dry materials, the improved process which comprises reacting phthalic anhydride with benzene and aluminum chloride under anhydrous conditions while mechanically agitating the reaction mixture to form a chemical complex of aluminum chloride and o-benzoyl benzoic acid and removing the by-product hydrogen chloride and unreacted benzene under anhydrous conditions while continuing the agitation to obtain the said complex as a dry, free-flowing material, and then converting the said dry complex into anthraquinone under anhydrous conditions by reacting it with from 0.9 to 1.3 parts of oleum of 5% to 20% strength at temperatures between 105° C. and 150° C. while mechanically agitating the reaction mixture until said complex is decomposed and converted into anthraquinone, aluminum sulfate and hydrogen chloride and removing the by-product hydrogen chloride under anhydrous conditions while continuing the agitation to obtain a dry, free-flowing mixture containing the anthraquinone admixed with anhydrous aluminum sulfate as a by-product, the amount of oleum being sufficient to decompose said complex and fix the aluminum and chlorine constituents thereof as aluminum sulfate and hydrogen chloride, respectively, and sufficient to effect complete ring closure of the o-benzoyl benzoic acid constituent thereof at the reaction temperatures employed in said reaction, but insufficient to convert the said dry mixture of solid reaction products into a pasty composition.

2. The process of claim 1 wherein the anthraquinone so obtained is subsequently recovered from the dry mixture containing the same, by adding the said dry mixture to sufficient water to dissolve the aluminum sulfate and separating the anthraquinone from the aqueous solution of aluminum sulfate.

3. The process of claim 1 wherein the formation of the said free-flowing, dry chemical complex of aluminum chloride and o-benzoyl benzoic acid is effected by mixing the phthalic anhydride and aluminum chloride under anhydrous conditions and subjecting the dry mixture to mechanical grinding until a fine, well-blended powder is obtained, adding the benzene to the powdered mixture while continuing the mechanical grinding thereof and maintaining the so-agitated reaction mixture at reaction temperature until the reaction is substantially complete, the by-product hydrogen chloride and the unreacted benzene being removed under anhydrous conditions while continuing the mechanical grinding to obtain said dry complex as a free-flowing powder.

4. The process of claim 1 wherein the said decomposition and conversion of the said dry chemical complex into anthraquinone and said by-products by reacting the dry complex with oleum is effected under anhydrous conditions while subjecting the reaction mixture and reaction products to mechanical grinding to produce said dry mixture containing the anthraquinone and anhydrous aluminum sulfate as a dry, free-flowing powder.

5. As an improvement in the manufacture of anthraquinone from a dry chemical complex obtained by reacting phthalic anhydride, benzene, and aluminum chloride by the Friedel-Crafts method under anhydrous conditions wherein the said dry chemical complex is decomposed and converted into anthraquinone by reacting the same with oleum under anhydrous conditions, the improvement which comprises reacting said dry chemical complex with from 0.9 to 1.3 parts of oleum of 5% to 20% strength at temperatures between 105° C. and 150° C. while mechanically agitating the reaction mixture until said complex is decomposed and converted into anthraquinone, aluminum sulfate, and hydrogen chloride and removing the by-product hydrogen chloride under anhydrous conditions while continuing the agitation to obtain a dry, free-flowing mixture containing the anthraquinone admixed with anhydrous aluminum sulfate as a by-product, the amount of oleum being sufficient to decompose said complex and fix the aluminum and chlorine constituents thereof as aluminum sulfate and hydrogen chloride, respectively, and sufficient to effect complete ring closure of the o-benzoyl benzoic acid constituent thereof at the reaction temperatures employed in said reaction, but insufficient to convert the said dry mixture of solid reaction products into a pasty composition.

6. The process of claim 5 wherein oleum of 10% to 20% strength is employed.

7. The process of claim 5 wherein the ratio of oleum to dry complex ranges from 0.9 to 1.0 part of oleum to 1 part of dry complex.

8. The process of claim 5 wherein the reaction between the oleum and the said dry complex is effected at temperatures between 110° C. and 150° C.

9. The process of claim 5 wherein the oleum is oleum of 10% to 20% strength and the reaction is effected at temperatures between 110° C. and 150° C., the ratio of oleum to said dry complex being between 0.9 and 1.0 parts of oleum to 1 part of dry complex.

10. The process of claim 5 wherein the reaction of oleum with the said dry complex under anhydrous conditions is effected by gradually adding the oleum to the dry complex at temperatures between 60° C. and 100° C. while mechanically agitating the reaction mixture under anhydrous conditions and then heating the reaction mixture to temperatures between 105° C. and 150° C. while continuing the agitation under anhydrous conditions until all the reactions are completed and a dry, free-flowing mixture of anthraquinone and aluminum sulfate is obtained.

11. As an improvement in the manufacture of anthraquinone from a dry chemical complex obtained by reacting phthalic anhydride, benzene, and aluminum chloride by the Friedel-Crafts method under anhydrous conditions wherein the said dry chemical complex is decomposed and converted into anthraquinone by reacting the same with oleum under anhydrous conditions, the improvement which comprises mechanically grinding the said dry complex under anhydrous conditions to a fine, free-flowing powder, gradually adding 0.9 to 1.3 parts of oleum of 5% to 20% strength to the said fine powder at temperatures between 60° C. and 100° C. while continuing the mechanical grinding, under anhydrous conditions, and then heating the reaction mixture to temperatures between 105° C. and 150° C. while continuing the mechanical grinding under anhydrous conditions until the decomposition and conversion of said dry complex into anthraquinone, aluminum sulfate and hydrogen chloride is substantially complete, and a dry, free-flowing mixture containing the anthraquinone and anhydrous aluminum sulfate is obtained, the by-product hydrogen chloride being removed under anhydrous conditions during said reaction at said temperatures and the amount of oleum being sufficient to decompose said complex and fix the aluminum and chlorine constituents thereof as aluminum sulfate and hydrogen chloride, respectively, and sufficient to effect complete ring closure of the o-benzoyl benzoic acid constituent thereof at the reaction temperatures employed, but insufficient to convert the said dry mixture of solid reaction products into a pasty composition.

GLEN MILLER SMYTH.
ALBERT EDWARD MORAN.

REFERENCES CITED

The following references are of record in the file of this patent:

UNITED STATES PATENTS

| Number | Name | Date |
| --- | --- | --- |
| 1,656,575 | Stone et al. | Jan. 17, 1928 |
| 1,826,621 | Lloyd et al. | Oct. 6, 1931 |

OTHER REFERENCES

Harding, "Color Trade Journal," vol. 9 (1921), pages 184–186.

Phillips, "Zeitschrift fur Farbenindustrie," vol. 20 (1928), pages 122–124.